US006745881B1

United States Patent
Kremer

(10) Patent No.: US 6,745,881 B1
(45) Date of Patent: Jun. 8, 2004

(54) ONE-WAY CLUTCH ASSEMBLY HAVING INTEGRATED DAMPING

(75) Inventor: John M. Kremer, Sterling Heights, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/318,519

(22) Filed: Dec. 12, 2002

(51) Int. Cl.[7] .................................. F16D 41/069
(52) U.S. Cl. .................... 192/46; 192/107 T; 192/108
(58) Field of Search ....................... 192/45, 46, 107 T, 192/108, 30; 60/345; 188/82.7

(56) References Cited

U.S. PATENT DOCUMENTS

| | | | |
|---|---|---|---|
| 1,831,955 A | 11/1931 | Harney | |
| 2,173,044 A | 9/1939 | Ruggles et al. | 180/44 |
| 2,290,089 A | 7/1942 | Bock | 180/49 |
| 2,551,939 A | 5/1951 | Gerst | 192/48 |
| 2,887,201 A | 5/1959 | Willis | 192/67 |
| 2,906,383 A | 9/1959 | Gabriel | 192/85 |
| 2,969,134 A | 1/1961 | Wiedmann et al. | 192/84 |
| 3,481,436 A | 12/1969 | Wilkowski | 192/35 |
| 3,517,573 A | 6/1970 | Roper | 74/711 |
| 3,631,741 A | 1/1972 | Kelbel | 74/781 |
| 4,114,478 A | 9/1978 | Clauss | 74/781 |
| 4,796,728 A * | 1/1989 | Kanengieter et al. | 192/30 V |
| 5,165,509 A * | 11/1992 | Kanno et al. | 192/44 |
| 6,333,112 B1 * | 12/2001 | Field et al. | 192/30 R |
| 6,575,279 B2 * | 6/2003 | Quigley | 192/107 T |
| 2002/0148696 A1 * | 10/2002 | Enomoto et al. | 192/45 |

FOREIGN PATENT DOCUMENTS

WO  WO 99/45289  9/1999

* cited by examiner

Primary Examiner—Roger Pang
Assistant Examiner—Eric M. Williams
(74) Attorney, Agent, or Firm—Bliss McGlynn, P.C.; Greg Dziegielewski

(57) ABSTRACT

A clutch assembly (10) having an inner race (12), an outer race (14), and an engagement mechanism (16) disposed between the inner and outer races. The engagement mechanism (16) is operable to move between a disengaged position wherein the inner and outer races may freely rotate in one direction relative to one another and an engaged position wherein in the inner and outer races are locked so as to translate torque therebetween in the opposite rotational direction. The inner race (12) and outer race (14) may be defined by a plurality of plates (18, 12) and layers of elastomer (20, 24) that are disposed between adjacent plates in laminated fashion. The inner race and/or outer race may further include at least one bearing surface through which a force may be translated. The bearing surface is defined by a plurality of plates (70, 76) that are offset relative to an adjacent plate by a predetermined distance. The elastomeric layer (20, 24) allows movement of the offset plate (70, 76) in the direction of a force acting on the bearing surface such that the offset plates (70, 76) and the elastomeric layers (20, 24) act to absorb energy and dampen noise and vibration when the bearing surface is subjected to a force.

10 Claims, 4 Drawing Sheets

ONE-WAY CLUTCH ASSEMBLY HAVING INTEGRATED DAMPING

BACKGROUND OF THE INVENTION

1. Field of the Invention

The present invention relates, generally, to clutch assemblies and, more specifically, to a one-way clutch assembly having an integrated damping feature.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. Transmissions include one or more gear sets, which may include an inner gear, intermediate planet or pinion gears which are supported by their carriers, and outer ring gears. Various components of the gear sets are held or powered to change the gear ratios in the transmission.

One-way clutches are frequently employed in transmissions, transfer cases, and differentials to selectively transmit torque in one rotational direction, but not in the opposite rotational direction. To this end, one-way clutches typically include an inner race, an outer race, and an engagement mechanism disposed therebetween. The inner race is typically splined to a shaft or hub and the outer race is often connected to a transmission case, clutch hub, or stator assembly via splined connection. The engagement mechanism is operable to lock the inner and outer races together thereby transmitting torque in one relative direction. The engagement mechanism is further operable to allow freewheeling rotation between the inner and outer races in the opposite rotational direction. Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races.

As noted above, one-way clutches of this type have been employed in numerous applications in transmission, transfer cases, and differentials. For example, one-way clutches have been employed in conjunction with multiple friction clutches and planetary gear sets to effect low and reverse gear ratios in conventional transmissions. One-way clutches have also been employed in transfer cases that provide full time, part time, and "on demand" four wheel drive (4WD) capabilities. In these situations, the one-way clutch is typically disposed between the primary driveline and the secondary driveline. When the primary drive line attempts to over speed the secondary drive line, as will occur, for example, where the rear wheel is supported on a slick surface, such as ice and is spinning and the front wheels are solidly supported, the one-way clutch engages and transfers torque to the slipping wheel. In this way, 4WD is achieved, but in this case, only under circumstances that require it.

The one-way overrunning clutches of the related art are, for the most part, designed to be self-actuating. Thus, the clutches are designed to automatically shift between a locked-up mode wherein the inner and outer races are either held stationary or rotate together and a freewheeling mode wherein the inner and outer races freely rotate relative to one another. While the one-way clutches known in the related art have generally worked well for their intended purposes, they also have certain physical limitations and drawbacks.

For example, the inner and outer races may have to rotate over a relatively large angular distance while transitioning from the freewheeling mode to the locked-up mode. This angular distance is generally,referred to in the related art as "backlash." Backlash can result in unacceptable levels of noise and vibration as the engagement mechanism is deployed for torque translation between the inner and outer races. Generally speaking, the greater the backlash or angular distance traveled before engagement, the greater the noise and vibration generated during the transition from freewheeling to locked-up modes. Thus, excessive backlash causes undesirable driveline vibration and noise and ultimately results in a reduction in mechanical life due to the sometimes severe, repetitive impact forces that are generated during the operation of a one-way clutch employed, for example, in an automotive driveline Accordingly, there remains a need in the art for a one-way clutch that is capable of efficiently, effectively, and smoothly transitioning between a freewheeling mode of operation and a locked-up mode of operation. In addition, there remains a need in the art for such a one-way clutch that also dampens or attenuates the noise and vibration that are generated during this transition using clutches known in the related art.

SUMMARY OF THE INVENTION

The disadvantages in the related art are overcome in the clutch assembly of the present invention having an inner race, an outer race, and an engagement mechanism disposed between the inner and outer races. The engagement mechanism is operable to move between a disengaged position wherein the inner and outer races may freely rotate in one direction relative to one another and an engaged position wherein in the inner and outer races are locked so as to translate torque therebetween in the opposite rotational direction. The inner race is defined by a plurality of plates and layers of elastomer that are disposed between adjacent plates in laminated fashion. The inner race further includes at least one bearing surface through which a force may be translated. The bearing surface is defined by a plurality of plates that are offset relative to an adjacent plate by a predetermined distance. The elastomeric layer allows movement of the offset plate in the direction of a force acting on the bearing surface such that the offset plates and the elastomeric layers act to absorb energy and dampen noise and vibration when the bearing surface is subjected to a force.

Alternatively, or in addition to the laminated inner race, the outer race may similarly be defined by a plurality of plates and layers of elastomer that are disposed between adjacent plates in laminated fashion. The outer race may therefore include at least one bearing surface through which a force may be translated. The bearing surface is defined by a plurality of plates that are offset relative to an adjacent plate by a predetermined distance. The elastomeric layer allows movement of the offset plate in the direction of a force acting on the bearing surface such that the offset plates and elastomeric layers act to absorb energy and dampen noise and vibration when the bearing surface is subjected to a force.

In this way, even in circumstances where the clutch assembly includes a certain amount of "backlash," the bearing surfaces on the inner and/or outer races act to dampen or attenuate the noise and vibrations that are generated when the clutch is transitioned between its overrunning or freewheeling mode to its locked-up mode. Furthermore, the bearing surfaces may be formed on any suitable force transmitting surface or surfaces located on the inner and/or outer race. Accordingly, the bearing surfaces may be located at the inner splined surface of the inner race, the teeth formed on the outer circumference of the inner race, at strategic locations formed in the pocket defined on the inner circumference of the outer race as well as the outer splined surface of the outer race. Furthermore, those having ordinary skill in the art will appreciate that the bearing surface is not required to be deployed on every force transmitting surface of the clutch assembly but may be strategically employed at selective location to attenuate noise and vibration that is generated during normal operations of a one-way, overrunning clutch assembly. In this way, the one-way clutch assembly of the present invention is capable of efficiently, effectively, and smoothly transitioning between a freewheeling mode of operation and a locked-up mode of operation while, at the same time, reducing or dampening the noise and vibration that is generated during this transition.

BRIEF DESCRIPTION OF THE DRAWINGS

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
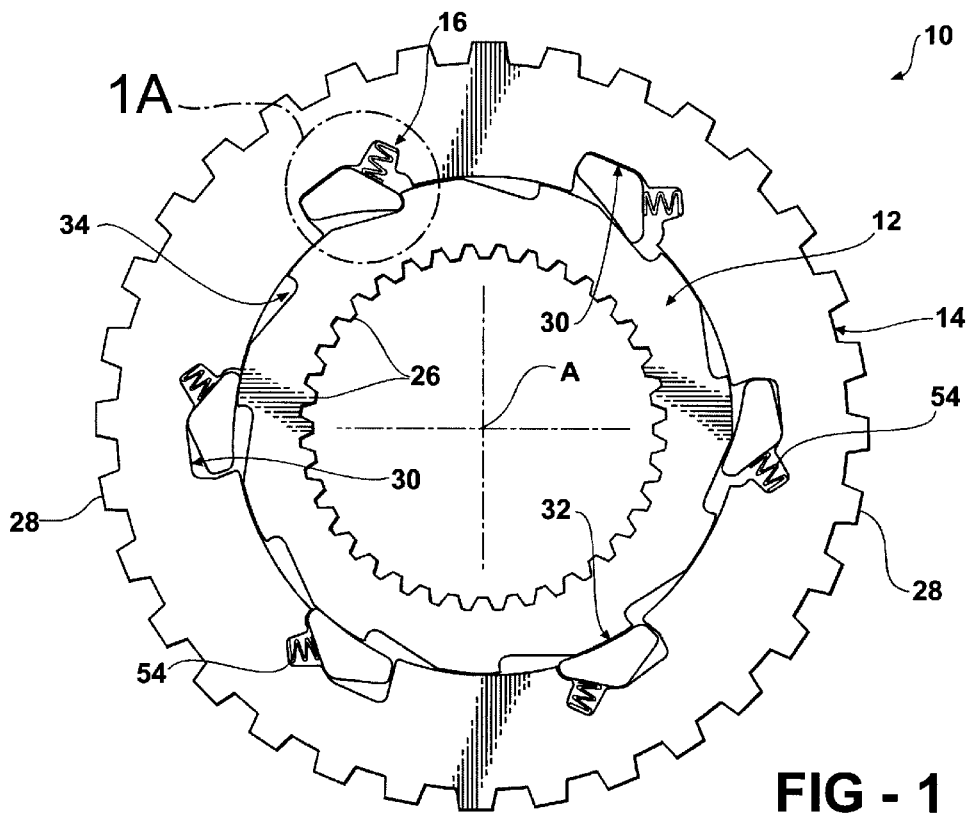
FIG. 1 is a cross-sectional side view of the one-way clutch assembly of the present invention showing the clutch assembly operating in its locked-up mode with the mechanism in its engaged position.
Figure 2:
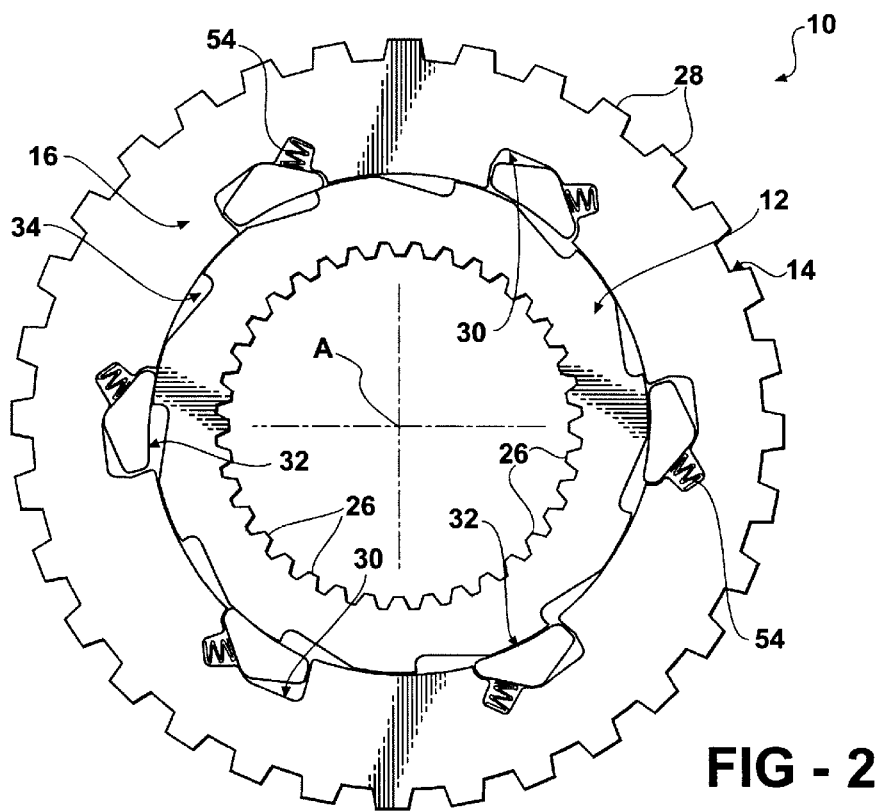
FIG. 2 is a cross-sectional side view of the one-way clutch assembly of the present invention showing the clutch assembly operating in its freewheeling mode with the engagement mechanism in its disengaged position.

A clutch assembly of the present invention is generally indicated at 10 in FIGS. 1 and 2, where like numerals are used to designate like structure throughout the drawings. In the preferred embodiment illustrated in these figures, the clutch assembly is a one-way overrunning clutch. The clutch assembly 10 is particularly adapted for use as a component of drivelines of land-based vehicles, such as in transmissions, transfer cases, differentials, torque converters, and the like. However, those having ordinary skill in the art will appreciate that the clutch assembly of the present invention may be employed in numerous applications.

Figure 6:
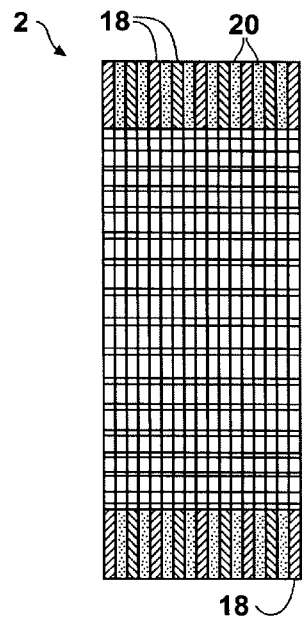
FIG. 6 is a cross-sectional side view of the inner race taken substantially along lines 6—6 of FIG. 3.
Figure 10:
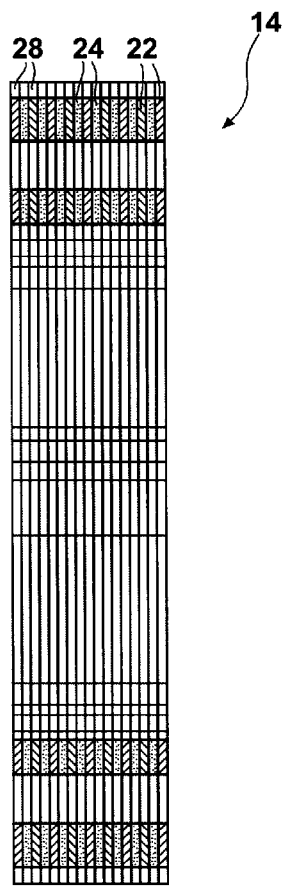
FIG. 10 is a cross-sectional side view of the outer race taken substantially along lines 10—10 of FIG. 7.

With continuing reference to FIG. 1, the clutch assembly 10 of the present invention includes an inner race, generally indicated at 12, an outer race, generally indicated at 14, and an engagement mechanism, generally indicated at 16, that is supported between the inner and outer races. The engagement mechanism 16 is operable to move between a disengaged position shown in FIG. 2 and an engaged position shown in FIG. 1. In the disengaged position, the inner and outer races 12, 14, respectively may freely rotate relative to one another in one direction. In the engaged position, the inner and outer races 12, 14 are locked so as to translate torque therebetween in the opposite rotational direction from which it freewheels. Either one of or both of the inner and outer races 12, 14 may be defined by a plurality of plates and layers of elastomer that are disposed between adjacent plates in laminated fashion. Thus, as illustrated in FIG. 6, the inner race 12 includes a series of plates 18 with layers of elastomer 20 sandwiched therebetween. Similarly, as shown in FIG. 10, the outer race 14 may include a plurality of plates 22 with layers of elastomer 24 sandwiched therebetween. The elastomer 20,24 employed between the plates 18 and 20 of the laminated inner and outer races 12, 14, respectively, may be of any suitable type such as neoprene, nitrile, and butyl. Those having ordinary skill in the art will appreciate that many different types and kinds of elastomers may be used and that the exact composition of the elastomer employed for this purpose is not critical to the invention. The purpose of the laminated structure of the inner and outer races 12, 14 will be described in greater detail below.

The inner race 12 includes a plurality of splines 26 formed about the inner circumference thereof. The splines 26 are adapted to cooperate in force transmitting manner with a corresponding splined member such as a hub or a shaft (not shown). Similarly, the outer race 14 includes a plurality of splines 28 formed on the outer circumference thereof. The splines 28 on the outer race 14 are adapted to cooperate in force transmitting manner with a corresponding splined member such as a transmission case, clutch hub, or stator assembly (not shown but commonly known in the art).

Figure 3:
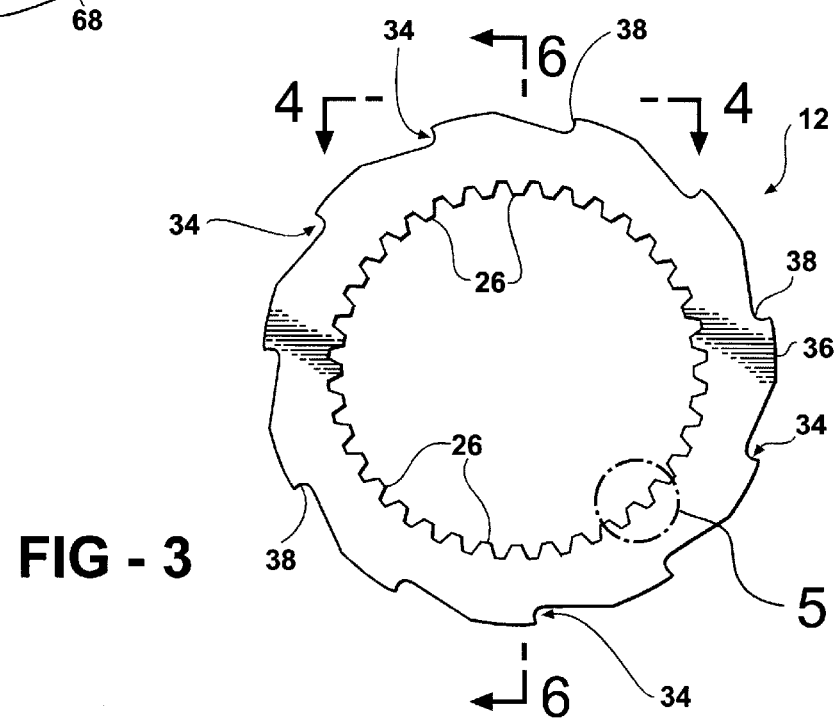
FIG. 3 is an enlarged side view of the inner race of the clutch assembly of the present invention.
Figure 7:
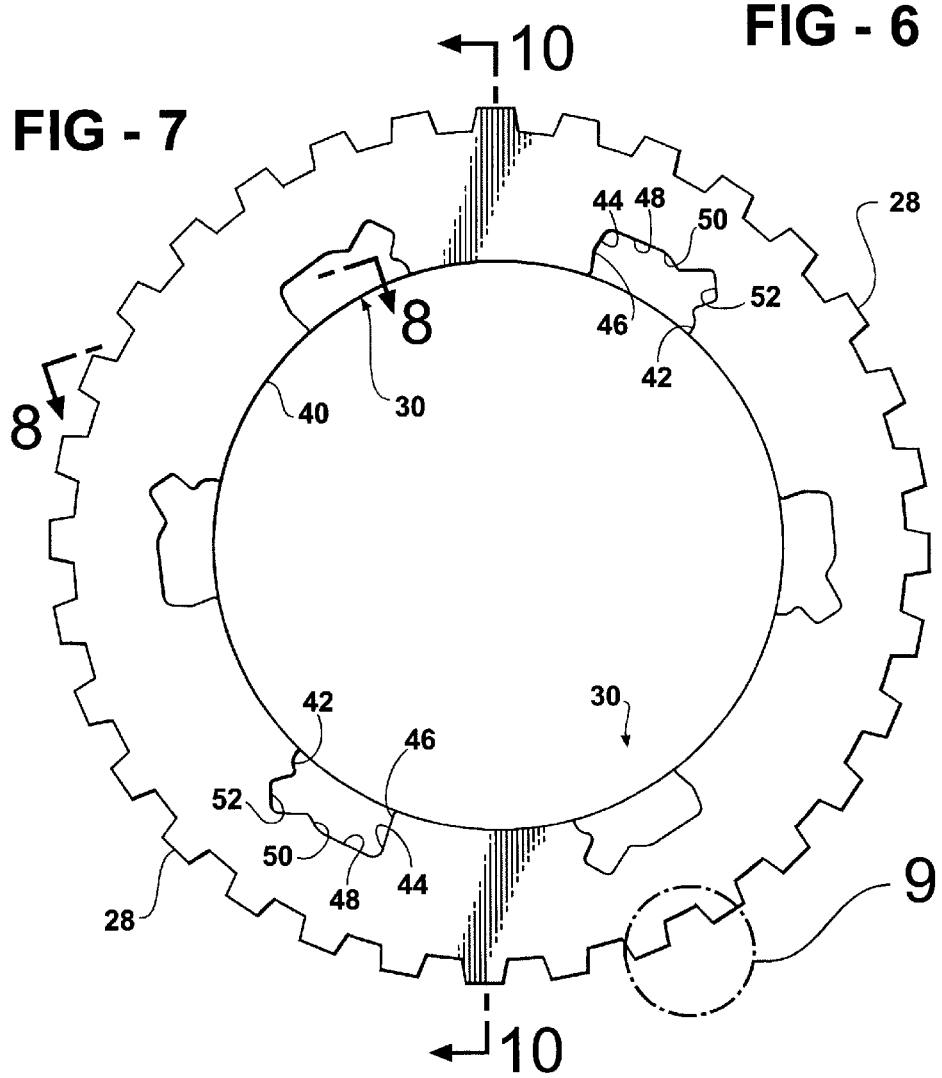
FIG. 7 is an enlarged side view of the outer race of the clutch assembly of the present invention.

As best shown in FIGS. 1 and 7, the engagement mechanism 16 includes a plurality of pockets, generally indicated at 30 and a corresponding plurality of pawls, generally indicated at 32. In addition, as best shown in FIG. 3, the engagement mechanism 16 includes a plurality of teeth, generally indicated at 34. In the preferred embodiment illustrated in these figures, the teeth 34 are formed on the outer circumference 36 of the inner race 12. Each tooth defines a flank 38. On the other hand, the plurality of pockets 30 are formed on the inner circumference 40 of the outer race 14. However, those having ordinary skill in the art will appreciate from the description that follows that the teeth 34 may be formed on the outer race 14 and the pockets 30 may be formed on the inner race 12 without departing from the scope of the present invention.

Figure 1A:
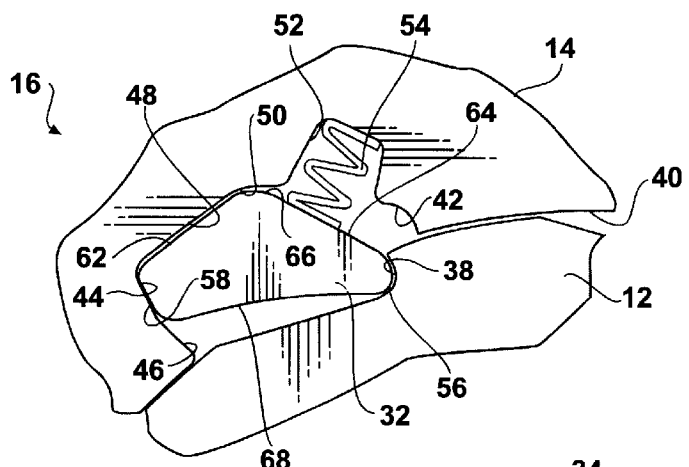
FIG. 1A is an enlarged side view illustrating a pawl of the engagement mechanism deployed in torque translating disposition between the inner race and the outer race.

The pawls 32 act to translate torque between the inner and outer races 12, 14 in one rotational direction. This occurs when the pawls 32 are disposed in their engaged position (FIGS. 1 and 1A). The specific structure of the pawls 32 and pockets 30 as well as the interaction of the engagement mechanism 16 between the inner and outer races 12, 14 that provides this functionality will be discussed in greater detail below.

Referring now to FIGS. 1A and 7, additional details of the preferred embodiment of the engagement mechanism 16 will be addressed. More specifically, each pocket 30 defines a leading end 42, a trailing end 44. In addition, each of the plurality of pockets 30 defines a ramp surface 46. A back portion 48 is defined adjacent to the trailing end 44 and a cradle portion 50 is defined between the back portion 48 and the leading end 42 of the pocket 30. An inner recess 52 is formed between the leading end 42 and the cradle portion 50. A biasing member 54 is supported within the inner recess 52 as will be described in greater detail below.

As alluded to above, each of the pawls 32 is moveably supported in a corresponding pocket 30 between an engaged position (FIG. 1A) and a disengaged position (FIG. 2). However, those having ordinary skill in the art will appreciate that not all pawls are deployed in the engaged position at one time. Rather, as illustrated in FIG. 1, only one pawl may be deployed in torque translating disposition at any given time. Alternatively, more than one pawl may also be deployed at the same time. When a pawl 32 is disposed in its engaged position, it provides torque translation between the inner and outer races 12, 14 in one rotational direction. On the other hand, when a pawl 32 is disposed in its disengaged position, torque translation between the inner and outer races is interrupted in the one rotational direction. To this end, each of the pawls 32 includes a leading edge 56 and a trailing edge 58 formed on opposite sides of the pawls 32. The leading edge 56 of the pawls 32 engages the teeth 34 defined on the outer circumference 36 of the inner race 12 so as to translate torque between the inner and outer races in one rotational direction when the pawls 32 are in their engaged position. On the other hand, the leading edge 56 of the pawls 32 is disposed in non-contacting relationship with the teeth 34 so that torque translation is interrupted between the inner and outer races when the pawls 32 are in their disengaged position.

As best shown in FIG. 2, the trailing edge 58 of each pawl 32 is supported by the ramp surface 46 when the pawl 32 is in its disengaged position. The trailing edge 58 is adapted to slidingly move relative to the ramp surface 46 defined in the pocket 30 as the pawl 32 is moved from its disengaged position to its engaged position as illustrated in FIG. 1 and 1A.

In addition, each pawl 32 also includes a top portion 62 that corresponds to the back portion 48 defined in each pocket. The top portion 62 is in contacting relationship with the back portion 48 of the pocket 30 when the pawl 32 is moved to its engaged position. A biased surface 64 is defined proximate to the leading edge 56 and a ridge portion 66 is defined between the biased surface 64 and the top portion 62 of the pawl 32. The biasing member 54 that is supported within the inner recess 52 of the pocket 30 acts on the biased surface 64 of the pawl to bias the pawl 32 toward the engaged position as illustrated in FIGS. 1 and 1A. The ridge portion 66 on each pawl 32 is adapted to be generally received in the cradle portion 50 of the pocket 30 so as to facilitate pivotal movement of the pawl 32 between the engaged and disengaged positions. A bottom surface 68 extends between the leading edge 56 and the trailing edge 58 of the pawl 32 opposite the top portion 62 and the biased surface 64.

Furthermore, while the pawls 32 may have any suitable geometric shape, as illustrated, for example, in FIGS. 1–2, the pawls 32 have a generally triangular shape when viewed from the side. The pawls 32 are supported in circumferentially spaced orientation about the rotational axis A of the clutch assembly 10. In addition, each pawl 32 defines a longitudinal axis that extends in the direction of the rotational axis A. In the preferred embodiment, the biasing member 54 is a Z-shaped spring having a longitudinal axis which corresponds to the longitudinal axis of the associated pawl 32 and is disposed within the inner recess 52 so as to be substantially parallel with the rotational axis A of the clutch assembly 10. However, those having ordinary skill in the art will appreciate that any number of biasing members known in the related art may be suitable for this purpose.

Figure 4:
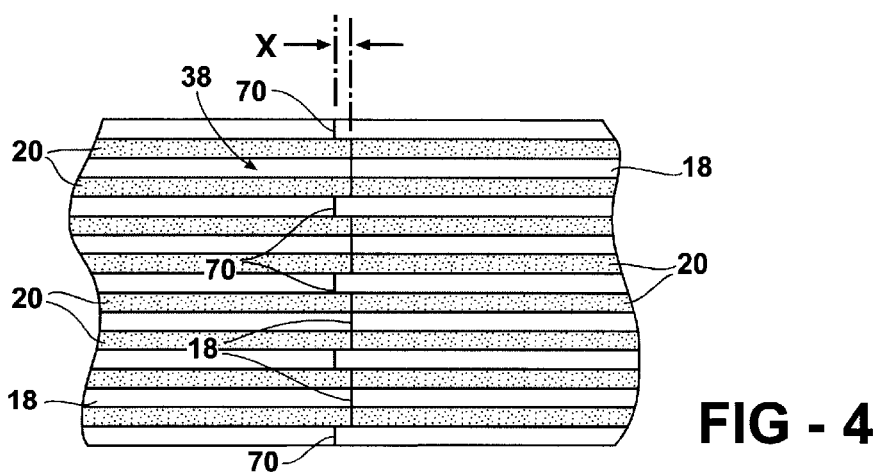
FIG. 4 is a view taken substantially along line 4—4 of FIG. 3 and illustrating a bearing surface on the inner race.

The laminated inner race 12 of the clutch assembly 10 of the present invention further includes at least one bearing surface through which a force may be translated. In this case, the bearing surface is defined by a plurality of plates 70 that are offset relative to an adjacent plate 18 by a predetermined distance. The elastomeric layer 20 located between adjacent plates 18, 70 allows movement of the offset plate 70 in the direction of a force acting on the bearing surface. In this way, the offset plates 70 and elastomeric layers 20 in the laminated inner race 12 act to absorb energy and dampen noise and vibration when the bearing surface is subjected to a force. More specifically, and in one representative example illustrated in FIGS. 3 and 4, the bearing surface may be defined at the flank 38 located on one or more of the teeth 34 formed on the outer circumference 36 of the inner race 12. As illustrated in FIG. 4, every other plate in the laminated inner race 12 includes or terminates in an offset portion "X". However, those having ordinary skill in the art will appreciate that the inner race 12 may include additional offset plates 70 than those illustrated in FIG. 4 and, similarly, may include less offset plates 70 as illustrated in this figure without departing from the scope of the present invention.

As noted above, each flank 38 is adapted to transmit a force between the inner race 12 and the outer race 14 through the engagement mechanism 16. When the engagement mechanism 16 is disposed in its engaged position, at least one of the pawls 32 is in force transmitting contact with at least one of the flanks 38. The leading edge 56 of the pawl 22 engages the tooth 34 at the location of the flank 38. In this operative mode, the offset plates 70 move relative to the elastomer 20 so as to reduce the amount of offset "X" thereby absorbing the energy of the force and dampening the noise and vibration that may otherwise occur at the interaction of the pawl 32 and the tooth 34.

Figure 5:
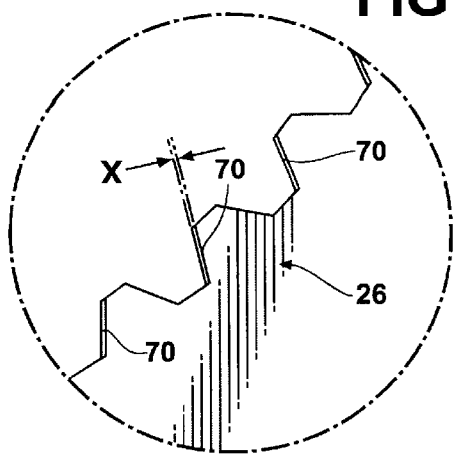
FIG. 5 is an enlarged view of the splines located at the inner circumferential diameter of the inner race and illustrating another bearing surface on the inner race.

Alternatively, and referring now to FIGS. 3 and 5, at least one of the splines 26 formed on the inner circumference of the laminated inner race 12 may include a bearing surface. However, those having ordinary skill in the art will appreciate that a plurality of the splines 26 may include the bearing surface through which force may be transmitted. In this case, the offset plates 70 of the bearing surface move relative to the elastomer 20 so as to reduce the amount of offset "X" thereby absorbing the energy of the force acting through the splines 26 and dampening noise and vibration generated during the operation of the clutch assembly.

Figure 8:
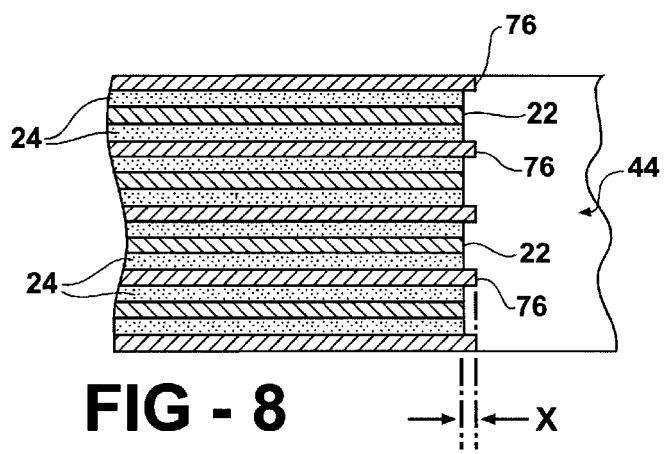
FIG. 8 is a cross-sectional view taken substantially along lines 8—8 of FIG. 7 and illustrating a bearing surface defined on the outer race.

On the other hand, and as noted above, the outer race 14 may be formed of a laminated construction. In this case, the outer race 14 may further include at least one bearing surface through which a force may be translated. The bearing surface is defined by a plurality of plates 76 that are offset relative to an adjacent plate 22 by a predetermined distance. The elastomeric layer 24 allows movement of the offset plate 76 in a direction of the force acting on the bearing surface such that the offset plates 76 and the elastomeric layers 24 act to absorb energy and dampen noise and vibration when the bearing surface is subjected to a force. The bearing surface may be located at a number of places on the outer race 14. For example, as best shown in FIGS. 7 and 8, the bearing surface may be defined at the trailing end 44 of one or more pockets 30 formed on the inner circumference 40 of the outer race 14. As illustrated in FIG. 8, every other plate in the laminated outer race 14 includes or terminates in an offset portion 70. However, those having ordinary skill in the art will appreciate that the outer race 14 may include additional offset plates 76 than those illustrated in FIG. 8 and, similarly, may include less offset plates 76 as illustrated in this figure without departing from the scope of the present invention.

As noted above, the trailing end 44 of the pocket 30 is adapted to transmit a force between the inner race 12 and the outer race 14 through the pawl 32. When the engagement mechanism 16 is disposed in its engaged position, at least one of the pawls 32 is disposed in force transmitting contact with the trailing end 44 of its associated pocket 30 and the opposed tooth 34 formed on the outer circumference 36 of the inner race 12. When the bearing surface is formed on the trailing end 44 of the pocket 30, the offset plates 76 move relative to the elastomer so as to reduce the amount of offset "X" thereby absorbing the energy of the force and dampening the noise and vibration that occurs during the operation of the clutch assembly.

Figure 9:
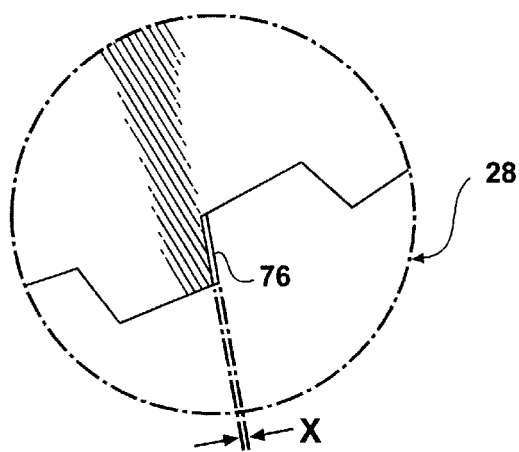
FIG. 9 is an enlarged view of the spline defined on the outer circumference of the outer race and illustrating another bearing surface.

Alternatively, and as best shown in FIGS. 7 and 9, the bearing surface may be formed on at least one of the splines 28 defined on the outer circumference of the outer race 14. However, those having ordinary skill in the art will appreciate that the bearing surface could be defined on a plurality of these splines 28. In either event, the offset plates 76 of the bearing surface move relative to the elastomer 24 in response to a force transmitted through the spline 28 to reduce the amount of offset "X" thereby absorbing the energy of the force and dampening noise and vibration.

In this way, even in circumstances where the clutch assembly 10 includes a certain amount of "backlash," the bearing surfaces formed at strategic locations on the inner and/or outer races 12, 14 act to dampen or attenuate the noise and vibrations that are generated when the clutch 10 is transitioned between its overrunning or freewheeling mode to its locked-up mode. The bearing surfaces may be formed on any suitable force transmitting surface or surfaces located on the inner and/or outer race. Accordingly, the bearing surfaces may be located at the inner splined surface 26 of the inner race 12, the teeth 34 formed on the outer circumference 36 of the inner race 12, at strategic locations formed in the pocket 30 defined on the inner circumference 40 of the outer race 14 as well as the outer splined surface 28 of the outer race 14. Furthermore, those having ordinary skill in the art will appreciate that the bearing surface is not required to be deployed on every force transmitting surface of the clutch assembly but may be strategically and alternatively employed at selective location to attenuate noise and vibration that is generated during normal operations of a one-way, overrunning clutch assembly. In this way, the one-way clutch assembly 10 of the present invention is capable of efficiently, effectively, and smoothly transitioning between a freewheeling mode of operation and a locked-up mode of operation while, at the same time, reducing or dampening the noise and vibration that is generated during this transition.

As will be clear from the foregoing discussion, the one-way overrunning clutch assembly 10 may be employed in any number of applications to provide the operational modes described above. For example, the clutch assembly 10 may be employed in transmissions, transfer cases, differentials, and torque converters.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

I claim:

1. A clutch assembly (10) comprising:
an inner race (12), an outer race (14), and an engagement mechanism (16) disposed between said inner race (12) and said outer race (14), said engagement mechanism (16) operable to move between a disengaged position wherein said inner and outer races may freely rotate in one direction relative to one another and an engaged position wherein said inner and outer races are locked so as to translate torque therebetween in the opposite rotational direction;
said inner race (12) defined by a plurality of plates (18) and layers of elastomer (20) disposed between said plates in laminated fashion, said inner race (12) further including at least one bearing surface through which a force may be translated, said bearing surface defined by a plurality of offset plates (70) wherein each one of said plurality of plates (70) is offset relative to an adjacent one of said plurality of plates (18) by a predetermined distance, said elastomeric layer (20) allowing movement of said offset plates (70) in the direction of a force acting on said bearing surface such that said offset plates (70) and elastomeric layers (20) act to absorb energy and dampen noise and vibration when said bearing surface is subjected to a force.

2. A clutch assembly (10) as set forth in claim 1 wherein said inner race (12) includes a plurality of teeth (34) formed on the outer circumference (36) of said inner race (12), said at least one bearing surface including a flank (38) defined on each of said plurality of teeth (34), each flank (38) adapted to transmit a force between said inner race (12) and said outer race (14) through said engagement mechanism (16).

3. A clutch assembly (10) as set forth in claim 1 wherein said engagement mechanism (16) includes a plurality of pawls (32) moveable between a disengaged position wherein said inner race and said outer race are freely rotatable relative to one another and an engaged position wherein at least one of said pawls (32) are in force transmitting contact with at least one flank defined on at least one of said plurality of teeth (34) and wherein said offset plates (70) moves relative to said elastomer so as to reduce the amount of offset thereby absorbing the energy of the force and dampening noise and vibration.

4. A clutch assembly (10) as set forth in claim 1 wherein said inner race (12) includes a plurality of splines (26) adapted to cooperate in force transmitting manner with a corresponding splined member, at least one of said splines (26) including said bearing surface through which force may be transmitted wherein said offset plates (70) moves relative to said elastomer so as to reduce the amount of offset thereby absorbing the energy of the force and dampening noise and vibration.

5. A clutch assembly (10) as set forth in claim 1 wherein said inner race (12) includes a plurality of splines (26) adapted to cooperate in force transmitting manner with a corresponding spline member, each of said splines (26)

including at least one of said bearing surfaces through which force may be transmitted wherein said offset plates (70) moves relative to said elastomer so as to reduce the amount of offset thereby absorbing the energy of the force and dampening noise and vibration.

6. A clutch assembly (10) comprising:

an inner race (12), an outer race (14), and an engagement mechanism (16) disposed between said inner race and said outer race, said engagement mechanism (16) operable to move between a disengaged position wherein said inner and outer races may freely rotate in one direction relative to one another and an engaged position wherein said inner and outer races are locked so as to translate torque therebetween in the opposite rotational direction;

said outer race (14) defined by a plurality of plates (22) and layers of elastomer (24) disposed between said plates in laminated fashion, said outer race (14) further including at least one bearing surface through which a force may be translated, said bearing surface defined by a plurality of offset plates (76) wherein each one of said plurality of plates (76) is offset relative to an adjacent one of said plurality of plates (22) by a predetermined distance, said elastomeric layer allowing movement of said offset plates (76) in the direction of a force acting on the bearing surface such that said offset plates (76) and elastomeric layers (24) act to absorb energy and dampen noise and vibration when said bearing surface is subjected to a force.

7. A clutch assembly (10) as set forth in claim 6 wherein said outer race (14) includes a plurality of pockets (30) formed on the inner circumference (40) of said outer race (14), each pocket (30) including a leading end (42) and a trailing end (44), said at least one bearing surface including said trailing end (44) such that each trailing end (44) is adapted to transmit a force between said inner race and said outer race through said engagement mechanism.

8. A clutch assembly (10) as set forth in claim 7 wherein said engagement mechanism (16) includes a plurality of pawls (32) moveably supported by said pockets (30) between a disengaged position wherein said inner race (12) and said outer race (14) are freely rotatable relative to one another and an engaged position wherein at least one of said pawls (32) are in force transmitting contact with said trailing end (44) of said pocket (30) and said inner race (12) and wherein said offset plates (76) move relative to said elastomer (24) so as to reduce the amount of offset thereby absorbing the energy of the force and dampening noise and vibration.

9. A clutch assembly (10) as set forth in claim 1 wherein said outer race (14) includes a plurality of splines (28) adapted to cooperate in force transmitting manner with a corresponding splined member, at least one of said splines (28) including said bearing surface through which force may be transmitted wherein said offset plates (76) moves relative to said elastomer (24) so as to reduce the amount of offset thereby absorbing the energy of the force and dampening noise and vibration.

10. A clutch assembly (10) as set forth in claim 1 wherein said outer race (14) includes a plurality of splines (28) adapted to cooperate in force transmitting manner with a corresponding spline member, each of said splines (28) including at least one of said bearing surfaces through which force may be transmitted wherein said offset plates (76) moves relative to said elastomer so as to reduce the amount of offset thereby absorbing the energy of the force and dampening noise and vibration.

* * * * *